(12) United States Patent
Song et al.

(10) Patent No.: US 7,858,227 B2
(45) Date of Patent: Dec. 28, 2010

(54) LITHIUM SECONDARY BATTERY

(75) Inventors: Minho Song, Yongin-si (KR); Youngjun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 989 days.

(21) Appl. No.: 11/436,409

(22) Filed: May 17, 2006

(65) Prior Publication Data

US 2006/0269838 A1 Nov. 30, 2006

(30) Foreign Application Priority Data

May 18, 2005 (KR) .................. 10-2005-0041421

(51) Int. Cl.
*H01M 2/04* (2006.01)
*H01M 2/06* (2006.01)
*H01M 2/08* (2006.01)

(52) U.S. Cl. .............. 429/175; 429/177; 429/181; 429/185

(58) Field of Classification Search ............ 429/174, 429/164, 177, 185, 175, 181
See application file for complete search history.

(56) References Cited

U.S. PATENT DOCUMENTS 6,638,661 B2 * 10/2003 Inoue et al. ............... 429/163

FOREIGN PATENT DOCUMENTS

| JP | 2005056649 A | * | 3/2005 |
| KR | 2003005800 | * | 1/2003 |
| KR | 20030066243 | * | 8/2003 |
| KR | 20030081939 | * | 10/2003 |
| KR | 20040022715 | * | 3/2004 |

OTHER PUBLICATIONS

Abstract of KR 20030066243 (Aug. 2003).*
Abstract of KR 20030081939 (Oct. 2003).*
Abstract of KR 20040022715 (Mar. 2004).*
Abstract of KR 2003005800 (Jan. 2003).*

* cited by examiner

*Primary Examiner*—Gregg Cantelmo
(74) *Attorney, Agent, or Firm*—Christie, Parker & Hale, LLP

(57) ABSTRACT

A lithium secondary battery having an electrode assembly including a first electrode plate, a second electrode plate, and a separator interposed between the first electrode plate and the second electrode plate. A case receives the electrode assembly and a cap assembly is coupled to the case to seal the case. The cap assembly includes a cap plate adapted to permit the insertion of electrolyte into the case, the cap plate including at least one recess. An insulation case located between the electrode assembly and the cap assembly is formed with at least one protrusion on an exterior-facing surface. The protrusion is adapted to be coupled to the recess to integrate the insulation case and the cap plate.

2 Claims, 3 Drawing Sheets

LITHIUM SECONDARY BATTERY

CROSS-REFERENCE TO RELATED APPLICATION

This application claims priority to and the benefit of Korean Patent Application No. 10-2005-0041421, filed May 18, 2005, the entire content of which is incorporated herein by reference.

BACKGROUND OF THE INVENTION

1. Field of the Invention

The present invention relates to a lithium secondary battery, and more particularly to a lithium secondary battery having an improved structure to prevent short-circuiting.

2. Description of the Prior Art

Recently, compact and light electronic devices such as cellular phones, laptop computers, camcorders and the like have been actively developed and produced. These portable electronic devices contain a battery pack to be operable without being plugged into an electrical outlet. The battery pack is provided with at least one battery therein so as to output a certain level of voltage to drive the portable electronic device for a given duration.

Battery packs have been developed to use rechargeable secondary batteries. Representative secondary batteries include nickel-cadmium batteries, nickel-hydrogen batteries, lithium batteries, and lithium ion batteries, etc.

Lithium secondary batteries have been rapidly developed because their energy density per unit weight is high, and their operation voltage is 3.6V, which is three times higher than nickel-cadmium batteries or nickel-hydrogen batteries.

In such a lithium secondary battery, an anode active material is made primarily from lithium-based oxide, while a cathode active material is made of carbon material. Generally, lithium secondary batteries can be classified into liquid electrolyte batteries and polymer electrolyte batteries based on the electrolyte used. Accordingly, batteries using a liquid electrolyte are referred to as lithium ion batteries, while batteries using a polymer electrolyte are referred to as lithium polymer batteries. Further, lithium secondary batteries are manufactured into various types, for example cylindrical types, polygonal types and pouch types.

Typically, a lithium secondary battery includes an electrode assembly having an anode electrode plate coated with an anode active material, a cathode electrode plate coated with a cathode active material and a separator interposed between the anode and cathode electrode plates to prevent electric short-circuiting and to allow only lithium ions to move. A typical lithium secondary battery also includes a case for receiving the electrode assembly, and electrolyte injected into the case for the lithium secondary battery for allowing the lithium ions to move. In the typical lithium secondary battery, the electrode assembly has a jelly-roll configuration.

The electrode assembly is manufactured by sequentially stacking and rolling the anode electrode plate coated with the anode active material and having an anode tap connected thereto, the separator, and the cathode electrode plate coated with the cathode active material and having a cathode tap connected thereto.

Next, the electrode assembly is inserted into the case. Then the insulation case is assembled with the case so as to be seated on the electrode assembly. After the cap assembly is coupled to the case, electrolyte is injected into the case. Then, the case is sealed, and manufacture of the lithium secondary battery is complete.

However, in the lithium secondary battery as described above, since the cap assembly is separate from the insulation case, movement of the insulation case may be caused by external impact, such as by dropping the battery. The movement of the insulation case applies pressure to the electrode assembly, thereby causing an electric short-circuit between the anode and cathode electrode plates of the electrode assembly.

SUMMARY OF THE INVENTION

A lithium secondary battery is provided in which a cap assembly is integrated with an insulation case seated on a portion of the electrode assembly, thereby preventing or reducing the likelihood of an electric short-circuit in the electrode assembly.

A lithium secondary battery is provided including an electrode assembly including a first electrode plate, a second electrode plate, and a separator interposed between the first electrode plate and the second electrode plate; a case having a space for receiving the electrode assembly; and a cap assembly coupled to the case so as to seal the case, and including an insulation case formed with at least one protrusion.

The cap plate and the insulation case are assembled with each other by fitting together the recesses and the protrusions. The cap plate has the recesses with a depth of 0.1 mm to 0.4 mm. The insulation case has the protrusions with a height of 0.8 mm to 1.7 mm.

The case includes a cap assembly receiving portion for receiving the cap assembly. The cap assembly receiving portion has a height of 2.2 mm to 2.5 mm.

According to another embodiment of the present invention, there is provided a lithium secondary battery which comprises: an electrode assembly including a first electrode plate, a second electrode plate, and a separator interposed between the first and second electrode plates; a case having a space for receiving the electrode assembly; a cap assembly coupled to the case so as to seal the case, and having at least one recess; and an insulation case disposed over an upper portion of the electrode assembly and having protrusions, for insulating the cap assembly from the electrode assembly.

The cap assembly and the insulation case are assembled with each other by fitting together the recesses and the protrusion.

The cap assembly includes a cap plate, an insulation plate, and a terminal plate, and the recesses are formed in at least one of the cap plate, the insulation plate, and the terminal plate.

DETAILED DESCRIPTION

Figure 1:
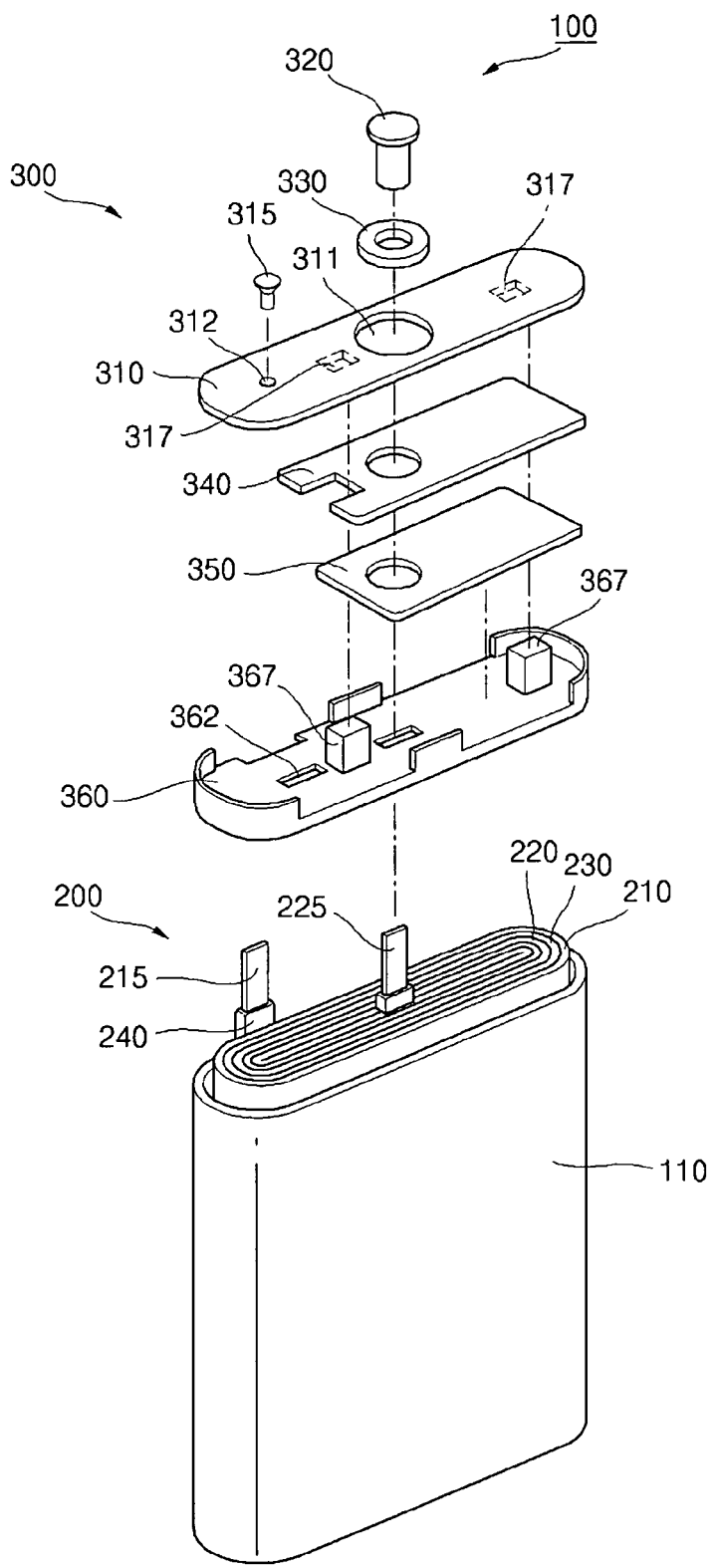
FIG. 1 is an exploded perspective view showing a lithium secondary battery according to an embodiment of the present invention.
Figure 2:
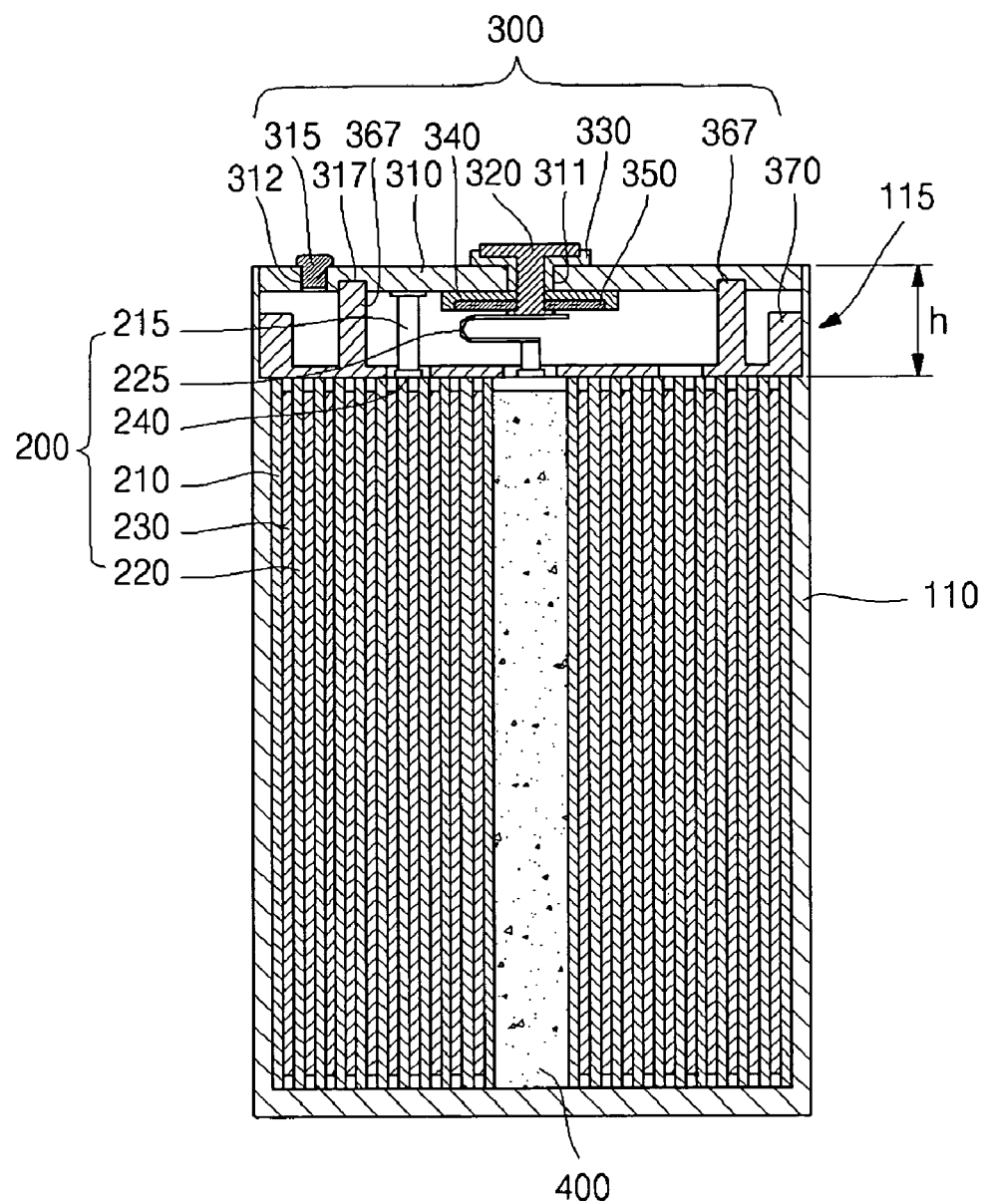
FIG. 2 is a sectional view showing the lithium secondary battery according to the embodiment of FIG. 1.

Referring to FIGS. 1 and 2, the lithium secondary battery 100 according to an embodiment of the present invention includes a case 110 for the lithium secondary battery, a jellyroll type electrode assembly 200 inserted into the case 110, a cap assembly 300 coupled to an upper portion of the case 110 and integrated with an insulation case 360, and electrolyte 400 injected into the case 110 to help lithium ions move in the electrode assembly 200.

The case 110, which functions as a terminal, is a metal can having a hexahedronal shape with an open end. The case 110 has a cap assembly receiving portion 115 for receiving the cap assembly 300. In one exemplary embodiment, the cap assembly receiving portion 115 has the height h of between about 2.2 mm to about 2.5 mm.

The electrode assembly 200 includes a first electrode plate 210 to which a first electrode tab 215 is attached, a second electrode plate 220 to which a second electrode tab 225 is attached, and a separator 230 interposed between the first electrode plate 210 and the second electrode plate 220. The electrode assembly 200 is wound in a jelly roll shape and inserted into the case 110. Boundary portions at which the first and second electrode tabs 215, 225 are extended from the electrode assembly 200 are insulated with a piece of insulation tape 240 to prevent or reduce the likelihood of an electric short-circuit between the first and second electrode plates 210, 220.

The first and second electrode plates 210, 220 have different polarities. An anode active material and a cathode active material may be coated on a surface of the first and second electrode plates 210, 220, respectively. Chalcogenide compounds, for example composite metal oxides such as $LiCoO_2$, $LiMn_2O_4$, $LiNiO_2$, $LiNi_{(1-x)}Co_xO_2$ (0<x<1), $LiMnO_2$, etc., may be used as the anode active material. The cathode active material may include carbon-based materials, Si, Sn, Tin oxide, composite tin alloys, transition metal oxides, lithium metal nitride, and lithium metal oxides, etc. In one exemplary embodiment of the present invention the first electrode plate 210 is made of aluminum and the second electrode plate 220 is made of copper. The separator 230 may be made of polyethylene resin (PE) or polypropylene resin (PP). However, the present invention is not limited to the materials of the first and second electrode plate and the separator described above.

The cap assembly 300 is provided with a flat cap plate 310 having a size and a shape corresponding to an opening of the case 110. The cap plate 310 has a thru-hole 311 formed at a center portion thereof, and an electrolyte injection hole formed at a side thereof. The electrolyte injection hole 312 is sealed by a plug 315 inserted into the electrolyte injection hole 312. Further, the cap plate 310 has a recess 317 formed at a portion on an interior-facing surface thereof.

An electrode terminal 320, for example a cathode terminal, is inserted into the thru-hole 311. A tube-shaped gasket 330 is mounted on a peripheral surface of the electrode terminal 320 to electrically insulate the electrode terminal 320 from the cap plate 310. An insulation plate 340 is disposed on an interior-facing surface of the cap plate 310 and a terminal plate 350 is attached to an interior-facing surface of the insulation plate 340.

The electrode terminal 320 extends through the thru-hole 311 with the gasket 330 mounted on the peripheral surface of the electrode terminal 320. The electrode terminal 320 is electrically connected at a terminal end thereof to the terminal plate 350 such that the insulation plate 340 is interposed between the cap plate 310 and the terminal plate 350.

The first electrode tab 215 extending from the first electrode plate 210 may be welded to an interior-facing surface of the cap plate 310 and the second electrode tab 225 extending from the second electrode plate 220 may be welded to the terminal end of the electrode terminal 320.

The cap assembly 300 has recesses 317 formed at portions thereof, for example, on an interior-facing surface of the cap plate 310.

The insulation case 360 is disposed over a portion of the electrode assembly 200 so as to electrically insulate the cap assembly 300 from the electrode assembly 200 and to cover a portion of the electrode assembly 200. The insulation case 360 has an electrolyte injection hole 362 located corresponding to the electrolyte injection hole 312 of the cap plate 310 to allow electrolyte to be injected into the case 110. The insulation case 360 may be made from polymer resin having an insulation characteristic, for example, PP. However, the present invention does not limit the material of the insulation case 360 to that mentioned above. Furthermore, the insulation case 360 has protrusions 367 at portions which correspond to recesses 317 of the cap plate 310. Specifically, the insulation case 360 is integrated with the cap plate 310 such that the protrusions 367 of the insulation case 360 are insertable into the recesses 317 of the cap plate 310. The recesses 317 of the cap assembly 300 are coupled to the protrusions 367 of the insulation case 360 so as to restrict the movement of the insulation case 360 with respect to the cap plate 310 from external impact caused by, for example, dropping of the lithium secondary battery 100. Thus, the likelihood of a short-circuit between the first and second electrode plates 210, 220 of the electrode assembly 200 may be prevented or reduced.

As shown in FIG. 2, the electrolyte 400 serves to help the lithium ions move. The lithium ions result from an electrochemical reaction of the anode and cathode of the battery during charging and discharging. The electrolyte may be non-aqueous organic electrolyte which is a mixture of lithium salts and high purity organic solvent. The electrolyte 400 may also be a polymer using a macromolecule electrolyte. However, the present invention does not limit the type of electrolyte 400 used.

Figure 3:
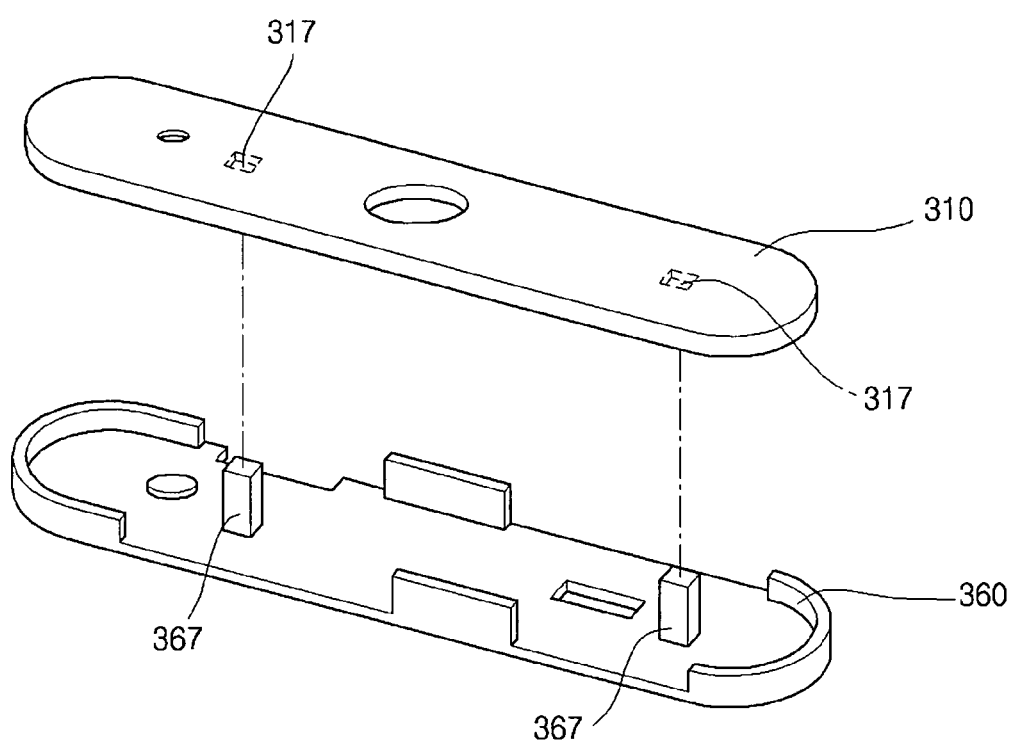
FIG. 3 is an exploded view showing a cap assembly and an insulation case of the lithium secondary battery according to the embodiment of FIG. 1.

Referring to FIG. 3, at least one recess 317 is formed on an interior-facing surface of the cap plate 310. In this embodiment shown in FIG. 3, there are two recesses 317. The recesses 317 of the cap plate 310 may have various cross-sectional shapes, for example, polygonal shapes such as a triangle or a square, a dosed-loop such as a circle or an oval, etc. However, the present invention does not limit the cross-sectional shape of the recesses to those mentioned above. The recesses 317 of the cap plate 310 may have a depth of between about 0.1 mm and about 0.4 mm.

The insulation case 360 of the lithium secondary battery 100 according to an embodiment of the present invention has protrusions 367 on an exterior-facing surface which correspond to the recesses 317 of the cap plate 310. The protrusions 367 are coupled to the recesses 317 of the cap plate 310 so that the insulation case 360 is integrated with the cap assembly 300. Therefore, the protrusions 367 of the insulation case 360 have a cross-sectional shape corresponding to the shape of the recesses 317 and may have a height of between about 0.8 mm and about 1.7 mm.

In other words, the insulation case 360 having the protrusions 367 is coupled to the cap plate 310 through the recesses 317 of the cap plate 310, so as to be integrated with the cap assembly 300 in the lithium secondary battery 100.

Although embodiments of the present invention have been described with respect to a structure in which the protrusions 367 of the insulation case 360 are coupled to the recesses 317 of the cap plate 310 so that the insulation case 360 is integrated with the cap plate 310, the recesses may be formed in any component of the cap assembly. For example, recesses may be formed in the insulation plate 340 or the terminal plate 350 instead of the cap plate 310 to which the protrusions 367 of the insulation case 360 may be coupled. Therefore, it is possible to restrict the movement of the insulation case 360, thereby preventing or reducing the likelihood of an electric short-circuit between the first and second electrode plates 210, 220.

Additionally, it will be understood by one skilled in the art that protrusions may be formed in the cap assembly and the recesses may be formed in the insulation case to integrate the cap assembly and the insulation case.

According to exemplary embodiments of the present invention as described above, a lithium secondary battery is provided in which the insulation case arranged on the electrode assembly is integrated with the cap assembly so as to prevent or reduce the likelihood of an electric short-circuit of the electrode assembly due to the movement of the insulation case.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising:
   an electrode assembly including a first electrode plate, a second electrode plate, and a separator interposed between the first electrode plate and the second electrode plate;
   a battery case containing the electrode assembly; and
   a cap plate coupled to the battery case to seal the battery case, the cap plate having at least one protrusion formed on an interior-facing surface of the cap plate; and
   an insulation case disposed on the electrode assembly, the insulation case having at least one recess on a surface facing the cap plate,
   wherein each of the at least one recess has a bottom surface and has a depth less than a height of the at least one protrusion such that the cap plate is spaced from the insulation case by the at least one protrusion abutting the bottom surface, and
   wherein each of the at least one recess is coupled to a corresponding one of the at least one protrusion to fix the cap plate to the insulation case.

2. A method for manufacturing a lithium secondary battery having a reduced likelihood to short circuit, the lithium secondary battery including an electrode assembly, a battery case containing the electrode assembly, a cap plate coupleable to the battery case to seal the battery case, the cap plate having at least one protrusion, and an insulation case located between the cap plate and the electrode assembly to electrically insulate the cap plate from the electrode assembly, the insulation case having at least one recess on a surface facing the cap plate, the at least one recess having a bottom surface and having a depth less than a height of the at least one protrusion such that the cap plate is spaced from the insulation case by the at least one protrusion abutting the bottom surface, the method comprising:
   inserting the electrode assembly into the battery case;
   coupling each of the at least one protrusion with a corresponding one of the at least one recess to fix the cap plate to the insulation case; and
   coupling the cap plate to the battery case to seal the battery case.

* * * * *